(12) United States Patent
Bump et al.

(10) Patent No.: US 10,786,794 B2
(45) Date of Patent: Sep. 29, 2020

(54) RECORDING MIXER ROTATION RATE ALONG WITH WEIGHT OF FEED AND DATE AND TIME

(71) Applicant: Digi-Star, LLC, Oakland, NJ (US)

(72) Inventors: Jerome A. Bump, Fort Atkinson, WI (US); Jack Allen Danner, Mayville, WI (US)

(73) Assignee: Digi-Star, LLC, Fort Atkinson, WI (US)

( * ) Notice: Subject to any disclaimer, the term of this patent is extended or adjusted under 35 U.S.C. 154(b) by 815 days.

(21) Appl. No.: 15/158,799

(22) Filed: May 19, 2016

(65) Prior Publication Data

US 2016/0343231 A1    Nov. 24, 2016

Related U.S. Application Data

(60) Provisional application No. 62/165,547, filed on May 22, 2015.

(51) Int. Cl.
*B01F 15/00* (2006.01)
*A01K 5/00* (2006.01)
(Continued)

(52) U.S. Cl.
CPC ........ *B01F 15/00201* (2013.01); *A01B 76/00* (2013.01); *A01C 7/20* (2013.01);
(Continued)

(58) Field of Classification Search
CPC .......... B01F 15/00201; B01F 15/00253; B01F 15/00376; B01F 15/00409;
(Continued)

(56) References Cited

U.S. PATENT DOCUMENTS

| | | | |
|---|---|---|---|
| 5,831,343 A | 11/1998 | Nakazaki | |
| 6,024,035 A | 2/2000 | Flamme | |

(Continued)

FOREIGN PATENT DOCUMENTS

| | | | |
|---|---|---|---|
| DE | 19940084 A1 | * | 3/2001 |
| EP | 2787480 A1 | | 10/2014 |

(Continued)

OTHER PUBLICATIONS

European Search Report dated Feb. 3, 2017, from European Patent Appln. No. EP16170692.4; 10 pgs.

(Continued)

*Primary Examiner* — Charles Cooley
(74) *Attorney, Agent, or Firm* — Chiesa Shahinian & Giantomasi PC

(57) ABSTRACT

A method includes the step of receiving a first weight value from a sensor associated with a feed mixer. A first rotation speed associated with the first weight value is monitored. A second weight value is received from the sensor associated with the feed mixer and a second rotation speed associated with the second weight value is monitored. A mixing profile is generated based on the first weight value, the second weight value, the first rotation speed, and the second rotation speed. In one embodiment, a first feed ingredient is associated with the first weight value and a second feed ingredient is associated with the second weight value.

6 Claims, 8 Drawing Sheets

(51) Int. Cl.
  *A01C 7/20* (2006.01)
  *A01B 76/00* (2006.01)
  *G05B 23/02* (2006.01)
  *G07C 5/00* (2006.01)
  *G08B 21/18* (2006.01)
  *B01F 7/00* (2006.01)
  *B01F 13/00* (2006.01)

(52) U.S. Cl.
  CPC ............... *A01K 5/00* (2013.01); *A01K 5/001* (2013.01); *B01F 13/004* (2013.01); *B01F 15/00129* (2013.01); *B01F 15/00311* (2013.01); *B01F 15/00318* (2013.01); *B01F 15/00922* (2013.01); *G05B 23/0264* (2013.01); *G07C 5/008* (2013.01); *G08B 21/182* (2013.01); *B01F 7/00* (2013.01); *B01F 15/00194* (2013.01); *B01F 15/00253* (2013.01); *B01F 15/00376* (2013.01); *B01F 15/00409* (2013.01); *B01F 2215/0013* (2013.01); *G05B 2219/24015* (2013.01); *G05B 2219/24055* (2013.01); *G05B 2219/24067* (2013.01); *G05B 2219/24084* (2013.01); *G05B 2219/2663* (2013.01); *G05B 2219/31462* (2013.01)

(58) Field of Classification Search
  CPC .......... B01F 15/00428; B01F 15/00318; B01F 15/00311; B01F 15/00922; B01F 13/004; B01F 15/00194; B01F 15/00129; B01F 2215/0013; B01F 7/00; B01F 2215/0008; B01F 15/00831; B01F 15/00331; B01F 7/00933; B01F 7/08; B01F 7/24; B01F 7/242; B01F 7/245; B01F 15/0295; G05B 23/0264; G05B 2219/24084; G05B 2219/24067; G05B 2219/31462; G05B 2219/2663; G05B 2219/24015; G05B 2219/24055; G07C 5/008; G08B 21/182; A01K 5/00; A01K 5/001; A01K 5/004; A01K 5/0001; A01K 5/0208; A01B 76/00; A01C 7/20
  See application file for complete search history.

(56) References Cited

U.S. PATENT DOCUMENTS

| | | | |
|---|---|---|---|
| 6,079,340 A | 6/2000 | Flamme et al. | |
| 6,496,766 B1 | 12/2002 | Bernold et al. | |
| 6,572,257 B2 * | 6/2003 | Bump | A01K 5/002 366/141 |
| 7,211,745 B1 | 5/2007 | Brown et al. | |
| 7,454,304 B2 * | 11/2008 | Johansen | G01G 19/08 177/136 |
| 8,146,624 B2 * | 4/2012 | Ghiraldi | A01K 5/02 141/108 |
| 8,608,368 B2 * | 12/2013 | Bresciani | A01K 5/00 119/51.01 |
| 8,651,730 B2 * | 2/2014 | Barbi | A23N 17/007 119/51.01 |
| 8,960,995 B2 * | 2/2015 | McCurdy | A01K 5/002 366/141 |
| 8,960,996 B2 * | 2/2015 | McNab Kerr | A23K 50/10 366/141 |
| 9,763,389 B2 * | 9/2017 | Bump | G01G 13/16 |
| 10,421,050 B2 * | 9/2019 | Bump | B01F 15/00922 |
| 10,499,680 B2 * | 12/2019 | Rowntree | B01F 7/081 |
| 10,520,351 B2 * | 12/2019 | Johansen | A01B 76/00 |
| 2002/0101781 A1 * | 8/2002 | Bump | A01K 5/002 366/141 |
| 2008/0078587 A1 * | 4/2008 | Johansen | G01G 19/08 177/136 |
| 2008/0126882 A1 | 5/2008 | Fulton et al. | |
| 2009/0144027 A1 | 6/2009 | Mindeman et al. | |
| 2011/0035139 A1 | 2/2011 | Konlditslotis et al. | |
| 2011/0064865 A1 * | 3/2011 | McCurdy | A01K 5/002 426/623 |
| 2011/0112688 A1 * | 5/2011 | McCurdy | A01K 5/002 700/265 |
| 2011/0128160 A1 | 6/2011 | Overholt et al. | |
| 2011/0261641 A1 * | 10/2011 | Barbi | A23N 17/007 366/141 |
| 2011/0295460 A1 | 12/2011 | Hunt et al. | |
| 2011/0320033 A1 * | 12/2011 | Bresciani | A01K 5/00 700/213 |
| 2012/0046838 A1 | 2/2012 | Landphair et al. | |
| 2012/0065759 A1 * | 3/2012 | Kerr | A23K 50/10 700/103 |
| 2012/0099948 A1 * | 4/2012 | Bump | G01G 13/16 414/21 |
| 2012/0130543 A1 * | 5/2012 | Bassett | B01F 15/00389 700/275 |
| 2012/0229394 A1 | 9/2012 | Ehrl et al. | |
| 2012/0287745 A1 * | 11/2012 | Ghiraldi | G05D 11/131 366/152.1 |
| 2013/0085598 A1 | 4/2013 | Kowalchuk | |
| 2013/0212420 A1 | 8/2013 | Lawson et al. | |
| 2013/0276709 A1 | 10/2013 | Ryder et al. | |
| 2014/0097952 A1 | 4/2014 | Shaw et al. | |
| 2014/0196919 A1 | 7/2014 | Kowalchuk | |
| 2014/0273827 A1 | 9/2014 | Killpack et al. | |
| 2014/0284118 A1 | 9/2014 | Van Mill et al. | |
| 2015/0112543 A1 | 4/2015 | Binion et al. | |
| 2015/0204713 A1 * | 7/2015 | Schlimgen | G01G 13/16 414/21 |
| 2015/0282428 A1 * | 10/2015 | Bump | G01G 13/16 414/21 |
| 2016/0055688 A1 | 2/2016 | Miura et al. | |
| 2016/0069446 A1 | 3/2016 | Konruff et al. | |
| 2016/0226977 A1 | 8/2016 | Fujiwara et al. | |
| 2016/0311527 A1 | 10/2016 | Poster | |
| 2016/0339405 A1 * | 11/2016 | Bump | B01F 13/004 |
| 2016/0339406 A1 * | 11/2016 | Bump | B01F 13/004 |
| 2016/0343231 A1 * | 11/2016 | Bump | B01F 13/004 |
| 2017/0084094 A1 | 3/2017 | Worden et al. | |
| 2017/0178421 A1 | 6/2017 | Worden et al. | |
| 2017/0318747 A1 * | 11/2017 | Bump | G01G 13/16 |
| 2018/0100759 A1 * | 4/2018 | Johansen | A01B 76/00 |
| 2018/0255823 A1 * | 9/2018 | Rowntree | B01F 15/00253 |
| 2019/0366287 A1 * | 12/2019 | Rowntree | A01K 5/002 |
| 2020/0077694 A1 * | 3/2020 | Rowntree | B01F 7/241 |
| 2020/0088564 A1 * | 3/2020 | Johansen | A01B 76/00 |

FOREIGN PATENT DOCUMENTS

| | | |
|---|---|---|
| EP | 3054409 A1 | 8/2016 |
| EP | 3070559 A1 | 9/2016 |
| WO | 2007078384 A1 | 7/2007 |
| WO | 2015045910 A1 | 4/2015 |
| WO | 2015072280 A1 | 5/2015 |

OTHER PUBLICATIONS

European Search Report dated Feb. 3, 2017, from European Patent Appln. No. EP16170710.4; 9 pgs.

European Search Report dated Feb. 6, 2017, from European Patent Appln. No. EP16170716.1; 8 pgs.

B. R. Mehta, et al., "Industrial Process Automation Systems", Butterworth-Heinemann, Nov. 26, 2014; pp. 1-31.

Communication pursuant to Article 94(3) EPC dated Jun. 11, 2019, in connection with European Patent Application No. 16170692.4, 10 pgs.

Communication pursuant to Article 94(3) EPC dated Jun. 11, 2019, in connection with European Patent Application No. 16170710.4, 8 pgs.

(56) References Cited

OTHER PUBLICATIONS

Non-Final Office Action dated Oct. 18, 2019, in connection with U.S. Appl. No. 15/158,825, filed May 19, 2016, 12 pgs.

* cited by examiner

RECORDING MIXER ROTATION RATE ALONG WITH WEIGHT OF FEED AND DATE AND TIME

The present application claims priority to U.S. Provisional Application No. 62/165,547, filed May 22, 2015, the disclosure of which is incorporated herein by reference in its entirety.

BACKGROUND

Agricultural machines may include various controls and sensors in order to control operation of the various aspects of the machines. An agricultural machine indicator (also referred to as an "indicator") provides an interface through which a user can perform operations such as modifying control parameters, options and/or settings and accessing machine information such as operating conditions. The large numbers of settings and options indicators offer provide benefits and challenges to users (also referred to as end users). On the positive side indicators can be customized to meet a wide variety of needs.

On the negative side when settings and options are setup incorrectly it can be challenging for the user, the Original Equipment Manufacturer (OEM) Dealer, the OEM, and the indicator manufacturer (also referred to as the "indicator provider") to find the setting, or settings, that prevent the indicator from operating correctly.

This is especially frustrating when Tech Support from the indicator provider or the OEM have difficulties due to; language, miscommunication, and a lack of understanding from the user.

SUMMARY

Remote access to a machine control indicator (using a smart device and/or farm network), significantly increases the ability of the OEMs and indicator providers to support products that are becoming increasingly complex. Problems and issues can be taken care of in less time which increases the efficiency of indicator provider and OEM Support Departments. This is especially true in International Markets where language barriers that result in travel time for field service calls can be eliminated. New indicator setup and customization can occur quickly and with less confusion and mistakes.

In addition, the functionality described herein provides OEMs, especially Mixer OEMs, with the ability to more closely monitor their equipment by providing access to an Hours of Use and a Maintenance Message functionality.

The need to provide improved methods of remotely accessing indicators to correct settings and options will only grow as a greater proportion of indicators are used with advanced settings for wireless (such as Wi-Fi) and Data Acquisition and Data Exchange.

Capabilities for software updates add an additional element to the need for remote access.

In one embodiment, a system and method provides a means to connect via radio or directly with the indicator that provides a means to access and setup the indicator as well as a means to update the software on the indicator.

Utilization of a Mobile Agricultural Weighing System to Monitor and Store Ancillary Operational Data for Diagnostic Purposes on Trailed and Truck-Mounted Equipment In one embodiment, a method and system for monitoring trailed and truck-mounted agricultural equipment uses a machine control indicator. The method and system provides the ability to transfer machine operation data to diagnose any problems and help the operator use the machine to obtain the best machine performance possible.

In one embodiment, a machine control indicator system (also referred to as a scale indicator system) provides monitoring and recording capability for operational data on: system settings, weight, rotation, revolutions per minute, peak weights, gearbox temperatures, hydraulic pressures, and the minimum and maximum limits of this data, on mobile agricultural Seed Tenders, Planters, Seed Drills, Air Seeders, Grain Carts, or Feed Mixers. This system utilizes wired, wireless, or data transfer devices such as USB Drives for the transfer of this data. The system allows for the transfer of data required to diagnose drive and weighing system operation from the machine's location to another location via email or wireless communication (such as Wi-Fi), thus allowing for real-time user viewable data related to the operation of the machinery.

Existing methods and systems utilize multiple systems and devices to accomplish the recording of the above noted operational performance data. Machines must be equipped with separate systems for individually monitoring: weight, operating speeds, gearbox temperatures, and hydraulic system pressures. The result is that Operator, OEM Dealer Support Technician, or Manufacturer must compare data from multiple sources to determine correlations and root causes that result in incorrect operation or equipment failures. Due to inherent variances in operational data collection it can therefore be difficult to properly determine the root causes and effects.

The method and system described herein employs the concept of utilizing the electronics of the scale system to provide additional monitoring and data collection of machine operational parameters related to: weight, rotation (On/Off), revolutions per minute, peak weights, temperatures of gearboxes, and temperatures and pressures of hydraulic systems, and the minimum and maximum limits for each of these parameters, with the date and time at which each event is recorded.

The Operator or Service Technician can download the recorded data using a USB Memory Device, Wired Cable Connection via Serial or CANBUS Communication, or wireless communication, to a computer or smart device equipped with a program or application that will display both the raw data in tabular form and with a graphical means based on a timeline.

The graphical display of the data allows the viewer to easily determine when an event, or events, results in a concurrent effect on another component or the machine operating system as a whole.

Diagnostic Monitoring and Recording of Hydraulic System Components on Agricultural Mixers In one embodiment, an Animal Feed Mixer (Dairy or Beef) Scale indicator system records Feed Mixer Operating Speed along with the operating temperatures and hydraulic & lube oil pressures of the mixer gearboxes and hydraulic drive system and notifies the operator and records the temperature or pressures, along with the weight, date, and time, when limits have been exceeded.

The system records when the temperature and/or pressures of the mixer gearbox(s) and hydrostatic drive system monitored by the scale indicator system exceed limits along with the weight of material in the mixer, and the operating speed of the main mixer auger, rotor, or reel (as noted above), with the time and date. The system can also display a warning message that the temperature or pressure limit has been exceeded.

Agricultural Feed Mixers, whether mounted on a trailer frame or truck chassis do not usually have an electronic system that will display warnings regarding the operating temperatures and pressures of the system being out of norm (like the oil pressure and temperature warning lights on an automobile). Therefore a need exists to display warnings in order to help protect the expensive components of the feed mixer's drive system.

In addition there is a need to record both, when the warnings are displayed, and how many times the warnings have been displayed. This information can be used by the machine owner to perform checks on his employee/operators, and by the OEM Dealer and Manufacturer to aid in failure cause and warrantee investigations.

Failure to heed the warnings can result in failures to gearboxes, hydraulic pumps, and/or hydraulic motors that are expensive to repair or replace.

Furthermore it is useful to record the warning information with other mixer operational parameters that are happening at the same time including the mixer operating speed and the weight of material inside the mixer.

The system described herein consists of a machine control indicator that also includes sensor inputs for rotational speed, pressure, and temperature.

The indicator is programmed with the required temperature and pressure limits (high, low, or both) that a particular machine is designed to operate within. These programming settings are secured by a "factory" access code that is not available to the end user.

When the limits of temperature or pressure are exceeded the indicator can display a "High Oil Temperature", "Low Oil Pressure", or "High Oil Pressure" warning on the display of the indicator in lieu of the weight information that is normally displayed. To clear the warning the operator will need to press a specific key to acknowledge.

The indicator can, at the same time as the above, record the following background information in an even record regarding the warning: Date, Time, Revolutions per Minute, Weight in Mixer, and the Temperature or Pressure.

The event records are retained, in one embodiment, in non-volatile memory which cannot be deleted without a factory access code and a special key sequence. The event records can be downloaded though the indicator's USB port.

Recording Mixer Rotation Rate Along with Weight of Feed and Date and Time

An Animal Feed Mixer (Dairy or Beef) Scale system that records Feed Mixer Operating Speed along with the Weight of Feed in the mixer over Time (with Date) is described herein.

The system can record the Rotations per Minute of the primary mixing auger(s), rotor, or reel of an agricultural Feed Mixer along with the weight of feed in the mixer with date & time.

When mixing feed for dairy and beef animals there 3 steps necessary to achieve a good mix. These are:

a. Loading the proper amount (by weight) of each feed ingredient: Corn Silage, Haylage, Dry Hay, Soy Meal, Cotton Seed, etc.

b. Processing individual, or combined ingredients, to achieve the correct ingredient size. Feed ingredients from large round and large square bales of hay or baleage take time inside the mixer to be processed to the correct length. These ingredients are added to the mixer first so that the mixer can process the bale (break down and cut up the material). The time the mixer is allowed to run with the first ingredient(s), before any other ingredients are added, needs to be monitored and controlled.

c. Once the mixer is completely loaded with all ingredients the total length of time the mixer mixes (actually the number of turns of the mixer) is very important. If the mixer is run for too short of a time the feed in the mixer will not be completely and uniformly mixed. If the mixer is run for too long of a period of time the mixer will over-mix the feed resulting in an over-processed mix with insufficient "length-of-cut" whereby the feed will not stimulate the rumen in the cow and the cow will not efficiently digest the feed.

It is important to note that the "Time" spent mixing is dependent on the speed that the mixer is turning. The mix process is dependent on the number of turns of the mixer, not the time. For example; by careful observation the farmer finds that it takes 4 minutes at 25 rpm to achieve the correct mix. This equals 100 turns of the mixer. If the farmer's father operates the mixer at a slower speed (20 rpm) he will need to run the mixer for an additional minute (5 minutes total) to achieve the same 100 turns of the mixer.

For this reason the speed at which the mixer operates over time is what needs to be measured and recorded in order to know the number of revolutions.

The system consists of:

a. A Scale Indicator that, in addition to weighing, is fitted with a Rotation Counter sensor fitted to a main auger, rotor, or reel drive component to both sense that the component is turning and to count the revolutions of the shaft.

b. The Indicator has a Setting to enter the correct ratio between the rotation that the Rotation Counter is sensing and the rotation of the main auger, rotor, or reel. The Indicator uses this ratio to count the rotations per minute that the main auger, rotor, or reel is turning. In one embodiment, this setting is protected by a security access code to prevent tampering with the settings.

c. The Indicator system records both the weight of the individual ingredients and the speed at which the mixer main auger, rotor, or reel is operating at over time (with date). The Indicator records this information at periodic intervals with the interval being adjustable.

The output data from the system can be displayed in a spreadsheet or graph showing Weight and RPM over Time.

From this data an indicator provider and/or the customer can produce a dual line graph which will show Time on the horizontal "X" axis and two "Y" axis where "Y1" records Weight and "Y2" records the Mixer RPM.

With this information it is easy to analyze the process and steps of loading the mixer, mixing the mix, and more as the feed is unloaded.

The concept of recording the Revolutions Per Minute while mixing, and the Total Revolutions that take place to make a mix, of the Feed Mixer is beneficial to the indicator provider, machine provider, and machine user.

By recording this information indicator provider can provide both the end user, and the manufacturer of the mixer, with data and information that is useful and important.

The farm owner/manager can determine if the employees operating the mixer are following instructions and are operating the mixer at the correct speed for each step and for the correct amount of time.

For the OEM manufacturer this info will tell the OEM if; the mixer has been over-sped, i.e. run at too high of a speed (such that it would cause damage), improper operation resulted in damage that is not warrantable, mixing data that the OEM can use to help train and coach the end user farmer in how to properly operate the mixer.

The system also senses the operating temperatures and hydraulic & lube oil pressures of the mixer gearboxes and hydraulic drive system and notifies the operator and records the temperature or pressures, along with the weight, date, and time, when limits have been exceeded.

Recording the Rotations per Minute of the primary mixing auger(s), rotor, or reel of an agricultural Feed Mixer along with the weight of feed in the mixer with date & time.

A method according to one embodiment includes the step of receiving a first weight value from a sensor associated with a feed mixer. A first rotation speed associated with the first weight value is monitored. A second weight value is received from the sensor associated with the feed mixer and a second rotation speed associated with the second weight value is monitored. A mixing profile is generated based on the first weight value, the second weight value, the first rotation speed, and the second rotation speed. In one embodiment, a first feed ingredient is associated with the first weight value and a second feed ingredient is associated with the second weight value. The weight of the second feed ingredient is approximately equal to the second weight value minus the first weight value.

In one embodiment, a first number of turns is determined based on the first rotation speed of the feed mixer and a time period during which the first rotation speed occurred. A second number of turns is determined at the second weight value based on the second rotation speed of the feed mixer and a time period over which the second speed occurred. A number of turns associated with the first feed ingredient is then determined based on the first number of turns and the second number of turns. A turn profile is generated indicating the number of turns associated with the first ingredient and the second number of turns, wherein the second number of turns is associated with the second feed ingredient. In one embodiment, the first rotation speed and the second rotation speed are associated with one of an auger, a rotor, or a reel of the feed mixer. In one embodiment, the mixer is operated based on a stored mixing profile. Instructions can be received at the machine control indicator to change one of the first time period and the second time period based on the stored mixing profile and a condition of the feed in the feed mixer after mixing. In one embodiment, a warning can be displayed via the machine control indicator in response to detection of over speed of the feed mixer. In one embodiment, a third rotation speed of the feed mixer is monitored. The third rotation speed is associated with discharging the feed mixer. The mixing profile is generated further based on the third rotation speed when the third rotation speed is monitored.

DETAILED DESCRIPTION

Figure 1:
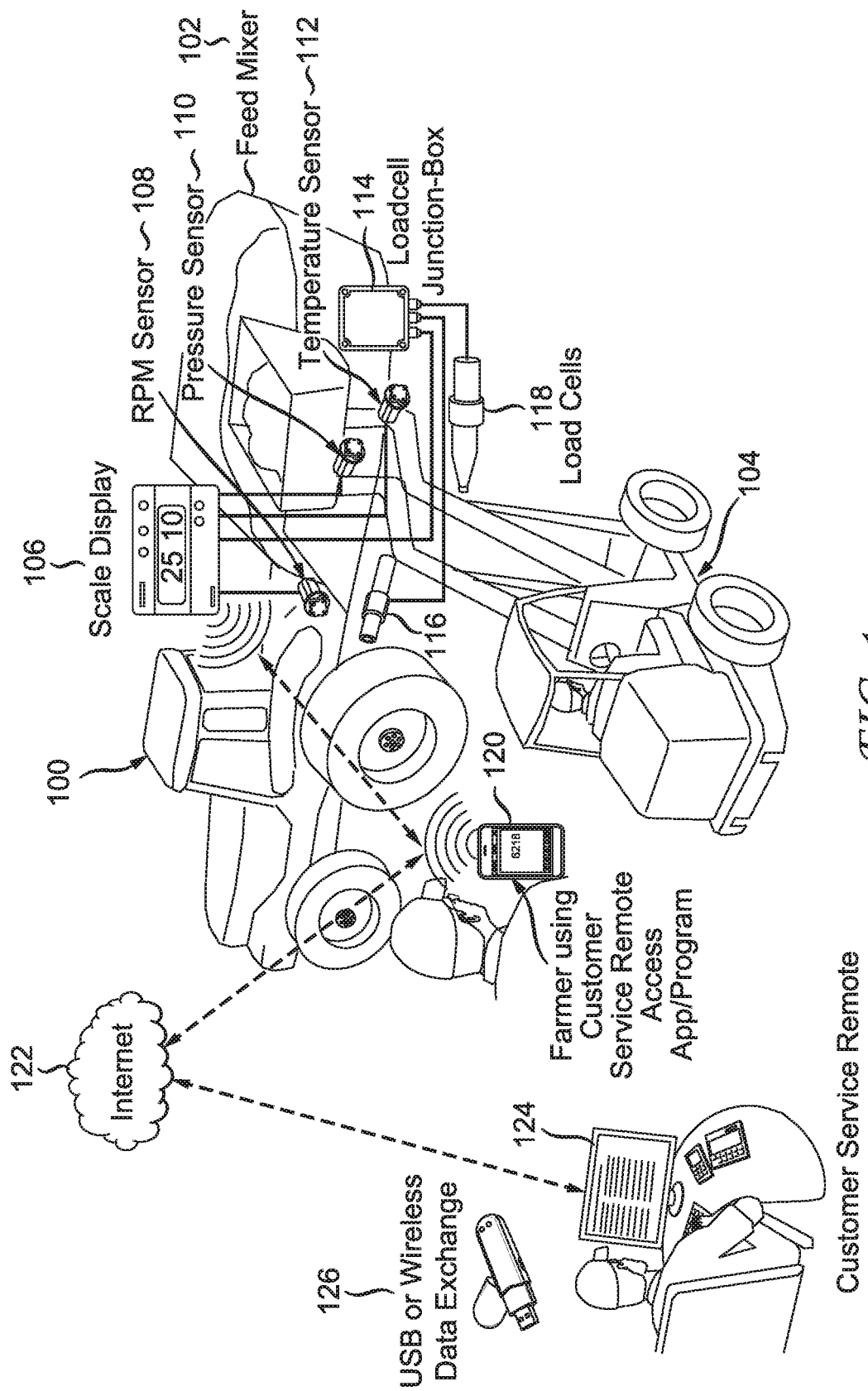
FIG. 1 depicts a system for remote indicator access according to one embodiment.

FIG. 1 depicts a system for remote indicator access according to one embodiment. As shown in FIG. 1, a tractor 100 has a machine attached. In this case, the machine is a feed mixer 102 for mixing ingredients to be fed to animals. Feed mixer 102 is shown in the process of receiving ingredients from front loader 104. Tractor 100 has a machine control indicator 106 (also referred to as a scale display or scale indicator) which can be located in the cab of tractor 100 to provide information to a user. Machine control indicator 106 can be mounted in other locations as well such as on feed mixer 102. Machine control indicator 106 receives inputs from various sensors including rotations per minute (RPM) sensor 108, pressure sensor 110, and temperature sensor 112. Machine control indicator 106 is also in communication with load cell junction box 114 which receives data from load cells 116 and 118 (also referred to as weight sensors) which can be used to provide weight information to indicator 106. In one embodiment, sensors 108, 110, and 112, and load cell junction box 114 are wired to machine control indicator 106. In other embodiments, various data can be transmitted from sensors wirelessly to machine control indicator 106. In one embodiment, machine control indicator 106 is also connected to various outputs such as alarms (e.g., 12 volt wired audible alarm).

Machine control indicator 106 is in communication with a user device 120 which can be any electronic device capable of communicating with machine control head 106. For example, user device 120 can be a smart phone or tablet. In one embodiment, user device 120 receives information from machine control indicator 106 which can then be displayed via an application (also referred to as app) or program executed by user device 120. User device 120 is also in communication with other devices via network 122 which can be any type of network such as a wide area network or local area network. In one embodiment, user device 120 communicates with a customer service device 124 and other devices via a network 122, such as the Internet.

In one embodiment, information displayed by machine control indicator 106 can also be viewed by user device 120. User device 120 can also be used to remotely interact with machine control indicator 106 in a manner similar to a user interacting directly with machine control indicator 106. A user can also allow another user, such as a customer service representative to view information displayed by machine control indicator 106. In one embodiment, user device 120 can act as a conduit to allow a user, such as a customer service representative, to interact with machine control indicator 106 using customer service device 124. Customer service device, in one embodiment, is a desktop computer but can be any type of device capable of communicating with user device 120 and indicator 106. In one embodiment, machine control indicator 106 is capable of communicating simultaneously with user device 120 and customer service device 124. Various communications can be facilitated by machine control indicator 106.

Figure 2:
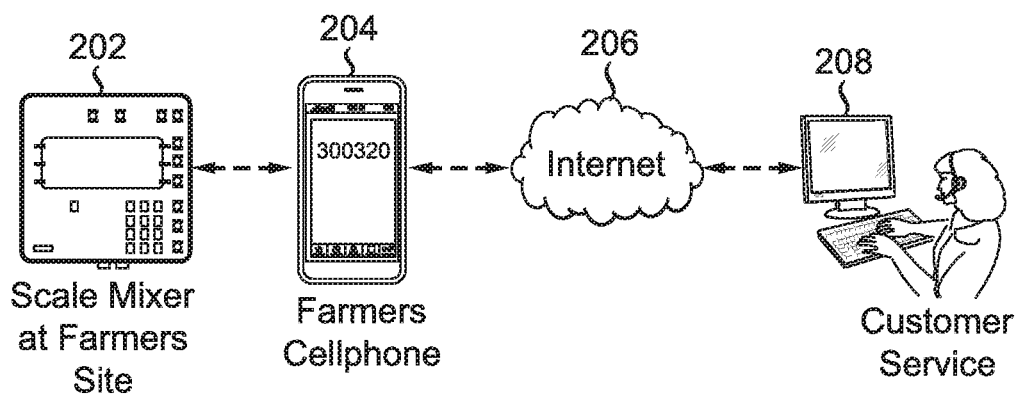
FIG. 2 depicts a system for remote indicator access according to another embodiment.

FIG. 2 depicts one embodiment in which machine control indicator 202 is in communication with customer service device 208 via a user device 204 and wide area network 206 (in this case, the internet). A customer service representative can use customer service device 208 running a remote access program to connect through wide area network 206 and user device 204 to allow data to be transferred from machine control indicator 202 to customer service device 208 and back. The transfer of information can be used to provide capabilities including remote cab control, menu setup setting transfer, other record transfer, etc.

Figure 3:
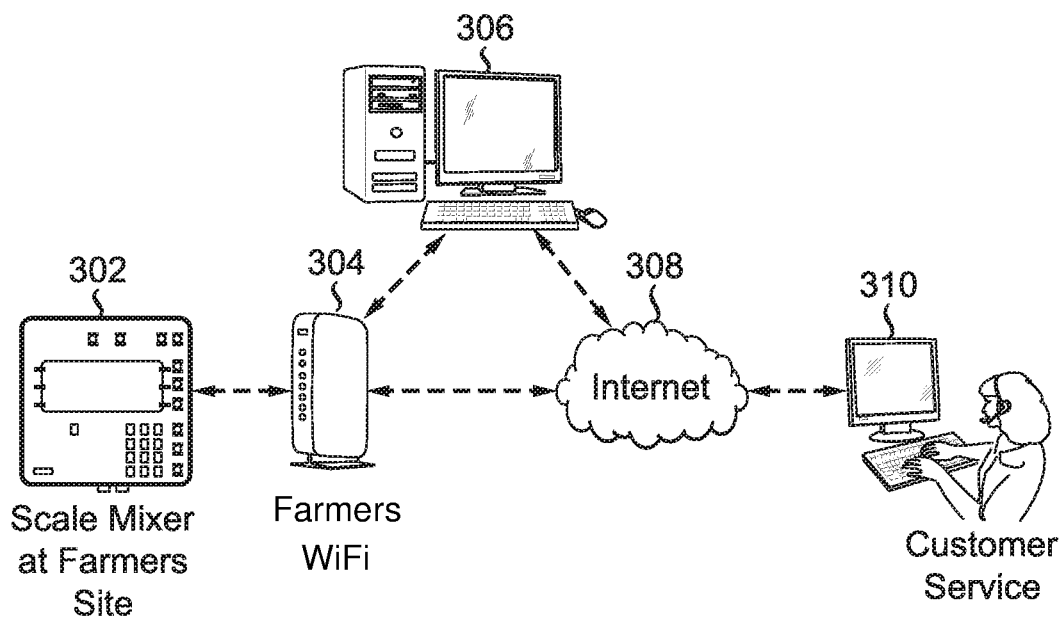
FIG. 3 depicts a system for remote indicator access according to another embodiment.

FIG. 3 depicts one embodiment in which machine control indicator 302 communicates with a customer service device 310 via a customer's local network. As shown in FIG. 3, machine control indicator 302 is in communication with customer's desktop computer 306 via the customer's wireless device 304 (e.g., a Wi-Fi router). Customer's desktop computer 306 is in communication with customer service device 310 via network 308 (e.g., the internet). In this embodiment, a customer service person can use customer service device 208 running a remote access program to connect to machine control indicator 302 through wide area network 308, customer's desktop computer 306, and customer's wireless device 304 to allow data to be transferred from machine control indicator 302 to customer service device 310 and back. The transfer of information can be used to provide capabilities including remote cab control, menu setup setting transfer, other record transfer, etc.

Figure 4:
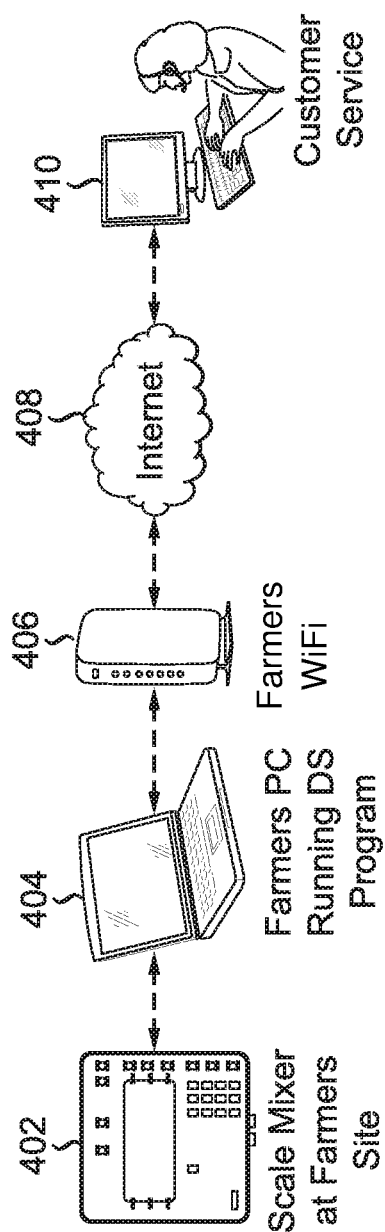
FIG. 4 depicts a system for remote indicator access according to another embodiment.

FIG. 4 depicts one embodiment in which machine control indicator 402 communicates with customer service device 410 via customer's computer 404 (e.g., a laptop), customer's wireless device 406 and wide area network 408 (e.g., the internet). Customer's computer 404 communicates with machine control indicator 402 and transmits information received from machine control indicator 402 to customer service device 410. Customer's computer 404 also transmits information from customer service device 410 to machine control indicator 402. The transfer of information can be used to provide capabilities including remote cab control, menu setup setting transfer, other record transfer, etc.

The wireless capability of the machine control indicator allows a user with a user device to stand in the general vicinity of the indicator and communicate with the indicator. This wireless capability allows a user to move around a machine associated with the machine control indicator and still view information from the indicator as well as control the indicator. As such, a user can perform various tasks without the need to be within reach of the indicator. In one embodiment, a customer service device can receive information directly from an indicator or via a user device. Various configurations which allow a customer service representative to view and/or modify indicator settings and information or a user to view and/or modify indicator settings are possible using one of the embodiments shown in FIGS. 1 through 4.

In one embodiment, a machine control indicator (e.g., 106, 202, 302, or 402) is provided with wireless circuitry internally mounted. In one embodiment, wireless circuitry is added to a machine control indicator in the form of an external add on device. Such an external device, in one embodiment is connected to the machine control indicator via a wired connection, such as a wired connection to a serial port. In one embodiment, a J905 connector, or other connector, is added to machine control indictor to allow the machine control indicator to be connected to other devices using, for example, an external radio module (ERM) or serial cable. In one embodiment, an internal diagnostic cable is located inside a machine control indicator that allows connection to other devices using, for example, an ERM or serial cable. In one embodiment, an internal diagnostic connection point (e.g., a header) is located inside each machine control indicator that allows connection to other devices using, for example, an ERM or serial cable.

Returning to FIG. 1, communication among machine control indicator 106, user device 120, and customer service device 124 facilitates multiple operations as follows.

Communication facilitates bi-directional transfer of indicator calibration and menu settings to and through the application (referred to as an "app") operating on user device 120. This allows service centers to connect to the indicator to backup and/or change the indicator's menu settings remotely. The indicator's menu settings can be transferred to and stored on the app to create a backup on the app device, to e-mail the settings to a customer service center for review, to transfer revised settings e-mailed from a customer service center through the app to the indicator, and/or allow data located on the app to be accessible to e-mail and other apps.

In one embodiment, information provided by an indicator can be viewed remotely using various devices. In one embodiment, "cab control" allows a user to view indicator information and interact with an indicator remotely. For example, a device facilitating cab control can be located in a cab of front loader 104 shown in FIG. 1. Cab control allows a user in the cab of front loader 104 to see how much of an ingredient has been added to mixer 102 as the user is operating front loader 104 and may not be in viewing range of an indicator associated with mixer 102.

Communication also facilitates real-time cab control via customer service device 124. This provides a customer service representative with the ability to interact with the indicator remotely in a manner similar to how a user can interact directly with the indicator. This allows a remote customer service representative to see everything a local cab control app screen is displaying on a user device. It also allows the service center to operate the indicator remotely (e.g., push keys, read the display, change menu settings, etc.). It also allows the service center to observe how a customer is running the indicator.

Communication also facilitates cab control via user device 120. This allows user device 120 to interact with the indicator remotely (e.g., push buttons, read the display, change calibration and menu settings, etc.) via an app running on user device 120. It should be noted that real-time cab control via customer service device 124 and via user device 120 can occur simultaneously.

Communication also facilitates a rotation counter and/or timer on the app. A rotation counter and/or timer provides a user with a timer countdown display and alarm activation functionality to allow the operator to take the user device with them and leave the mixing area to perform other tasks until the mix finishes.

Communication also facilitates an hour meter. An hour meter value can be displayed on the app. An hour meter value can be transferred to the app to allow additional maintenance messages to be displayed in accordance with OEM recommendations. In one embodiment, maintenance messages can be edited on the app. Editing can include editing of the message text to be displayed on the app and the number of hours at which the message is to be activated. In one embodiment messages are displayed via a pop-up box with the message and a button such as "OK" or "Clear" which requires a response from a user. Hour meter value information can be transferred to and/or from a service center.

Figure 5:
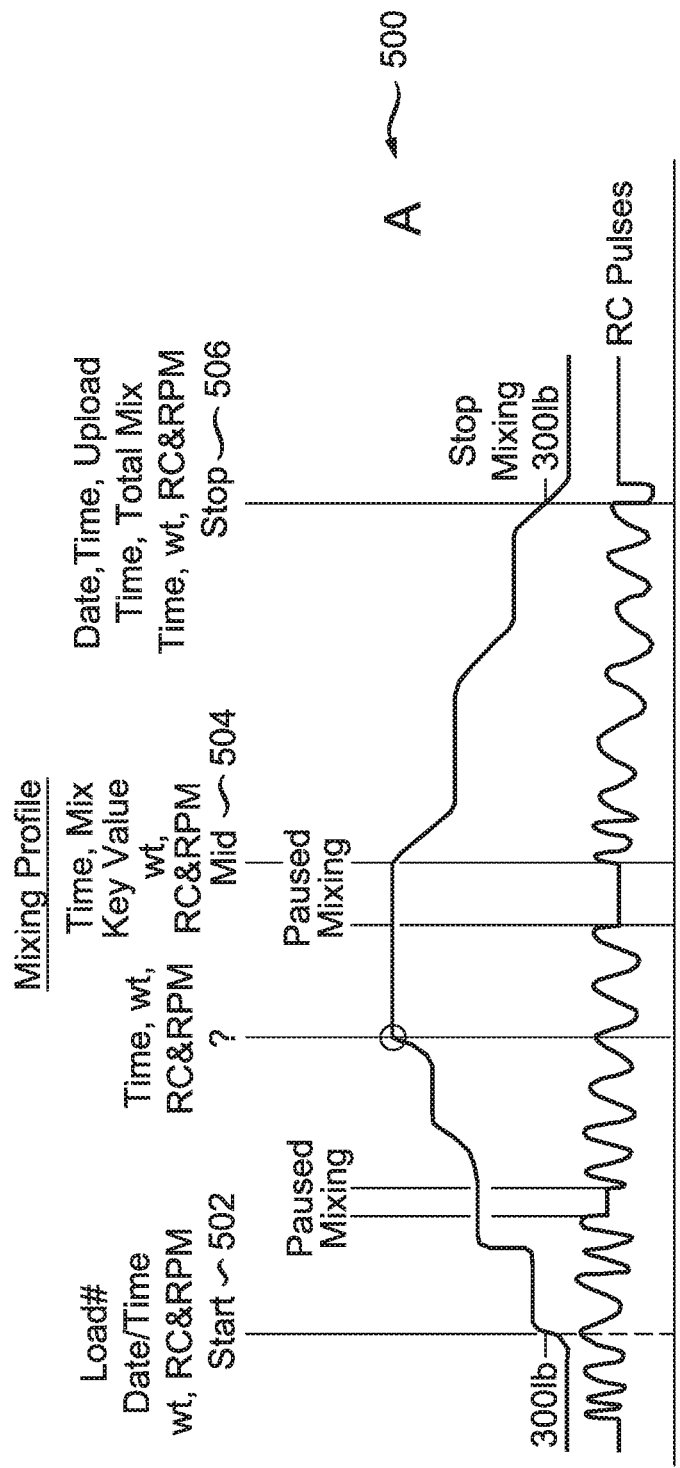
FIG. 5 depicts a mixing profile according to one embodiment.

Communication facilitates display of rotations per minute (RPM) history and/or analysis. FIG. 5 depicts graph 500 of a mixing profile according to one embodiment. Graph 500 depicts an RPM profile of how a user has been running their machine which can aid in determining if the user is mixing correctly. In one embodiment, mixing profile data is captured as follows.

Section A depicts data captured for each mixer load. Data is collected for the entire feed cycle including loading the mixer with ingredients, mixing the ingredients (mix time) and unloading of the mixer. In one embodiment, data is captured for at least the last 50 loads.

Starting point 502 is when the gross weight meets or exceeds the "Mix Log Start Point Weight" menu setting (default 300 lbs.) and pulses are being detected for the Rotation Counter (meaning the mix auger is rotating). The data logged for each mixer load at the "Start Pont", in one embodiment, includes:

i. Current Gross Weight (should be near 0 lbs/kgs—6 number).
 ii. Current Rotation Counter value (1234—Last 4 values of the Mixometer).
 iii. Current RPM value (1234—four numbers).
 iv. Current Time (14:15:46—6 character date and 24 hour dock with seconds)
 v. Current Date (17MR15).
 vi. Mix Load Number (123—Automatically increases for each load and should rollover from 999 to 001.)

Example data:
```
                10        20        30        40        50
      123456789012345678901234567890123456789012345678901 2
Start -> "000000,2150,0018,14:10:05,05FE08,001"
         i    ii   iii  iv       v    vi
```

Mid-Point 504 is when the gross weight decreases by the new "Mix Log Mid-Point Weight Tolerance" Menu setting (default 300 lbs.) This is to determine when the user has finished the loading/mixing process and is starting to unload the mixer. For example, a user adds and mixes feed ingredients up to mid-point 504. At mid-point 504, a discharge door or gate of the mixer is opened so that the feed can be discharged from the feed mixer for access by animals, such as livestock. A user may need to move the feed mixer around an area in order to discharge feed at various locations. As shown in FIG. 5, after mid-point 504, the weight of feed measured decreases as the feed mixer is emptied. The speed of the feed mixer is detected and recorded during the time the feed mixer is discharged. The method also supports shutting the mix auger OFF, pausing, and back ON again during the loading process. If the Rotation Counter stops seeing pulses (i.e. they have turned OFF the mix auger), the "Total Mix Time" is paused and then continues to accumulate the "Total Mix Time" when Rotation Counter pulses begin again. The mix auger must be rotating to unload a feed mixer, so rotation counter pulses should be seen while unloading the 300 lbs. The data logged for mid-point 504, in one embodiment, includes:

vii. Current Gross Weight.
 viii. Current Rotation Counter value (1234—Last 4 values of the Mixometer). This will be used to determine the number of rotation counts between the starting point and the mid-point—Mixer Loading Rotation Duration Counts (XXXX).
 ix. Current RPM value (1234—fournumbers).
 x. Mixer Loading Duration Time (HH:MM:SS)—this is the length of time between the starting point and the mid-point.
 xi. Current value entered/stored for the Rotation Counter key.
 xii. If batching: The total amount loaded identified by the batching code.
 i. Current Gross Weight (should be near 0 lbs/kgs—6 number).
 ii. Current Rotation Countervalue (1234—Last 4 values of the Mixometer).
 iii. Current RPM value (1234—four numbers).
 iv. Current Time (14:15:46—6 character date and 24 hour dock with seconds)
 v. Current Date (17MR15).
 vi. Mix Load Number (123—Automatically increases for each load and should rollover from 999 to 001.)

Example data:
```
                10        20        30        40        50
      123456789012345678901234567890123456789012345678901 2
Mid -> "024150,2175,0024,00:14:25,000025,024150"
         vii  viii ix   x         xi     xii
```

Stop Point 506 is when the gross weight decreases into the Zero/Balance point+the new "Mix Log Start Point Weight" described previously. The method also supports shutting the mix auger OFF, pausing and back ON again during the unloading process. If the Rotation Counter stops seeing pulses (i.e. they have turned OFF the mix auger), the "Total Mix Time" is paused and then continues to accumulate the "Total Mix Time" when Rotation Counter pulses begin again. The mix auger must be rotating to unload a feed mixer, so rotation counter pulses should be seen while unloading the 300 lbs.

The data logged for each mixer load at the "Stop Point", in one embodiment, includes:

xiii. Current Gross Weight (should be near 0 lbs/kgs).
 xiv. Current Rotation Countervalue (Mixometer).
 xv. Current RPM value (1234—four numbers).
 xvi. Mixer Unloading Duration Time (HH:MM:SS)—this is the length of time between the mid-point and the stop point.
 xvii. Total Time (includes seconds) while loading and mixing (stops when the operator starts the unloading process).
 xviii. Current Time (14:15:46—6 character date and 24 hour dock with seconds)
 xix. Current Date (17MR15).

Example data:
```
                10        20        30        40        50
      123456789012345678901234567890123456789012345678901 2
End -> "000000,2195,0010,00:08:10,00:22:35,14:33:35,05FE08"
         xiii xiv xv   xvi      xvii     xvii     xix
```

The data can also be combined as shown below:

Example of all three sets of data:
```
                10        20        30        40        50
      123456789012345678901234567890123456789012345678901 2
Start -> "000000,2150,0018,14:10:05,05FE08,0001"
Mid   -> "024150,2175,0024,00:14:25,000025,024150"
End   -> "000000,2195,0010,00:08:10,00:22:35,14:33:35,05FE08"
```

Figure 6:
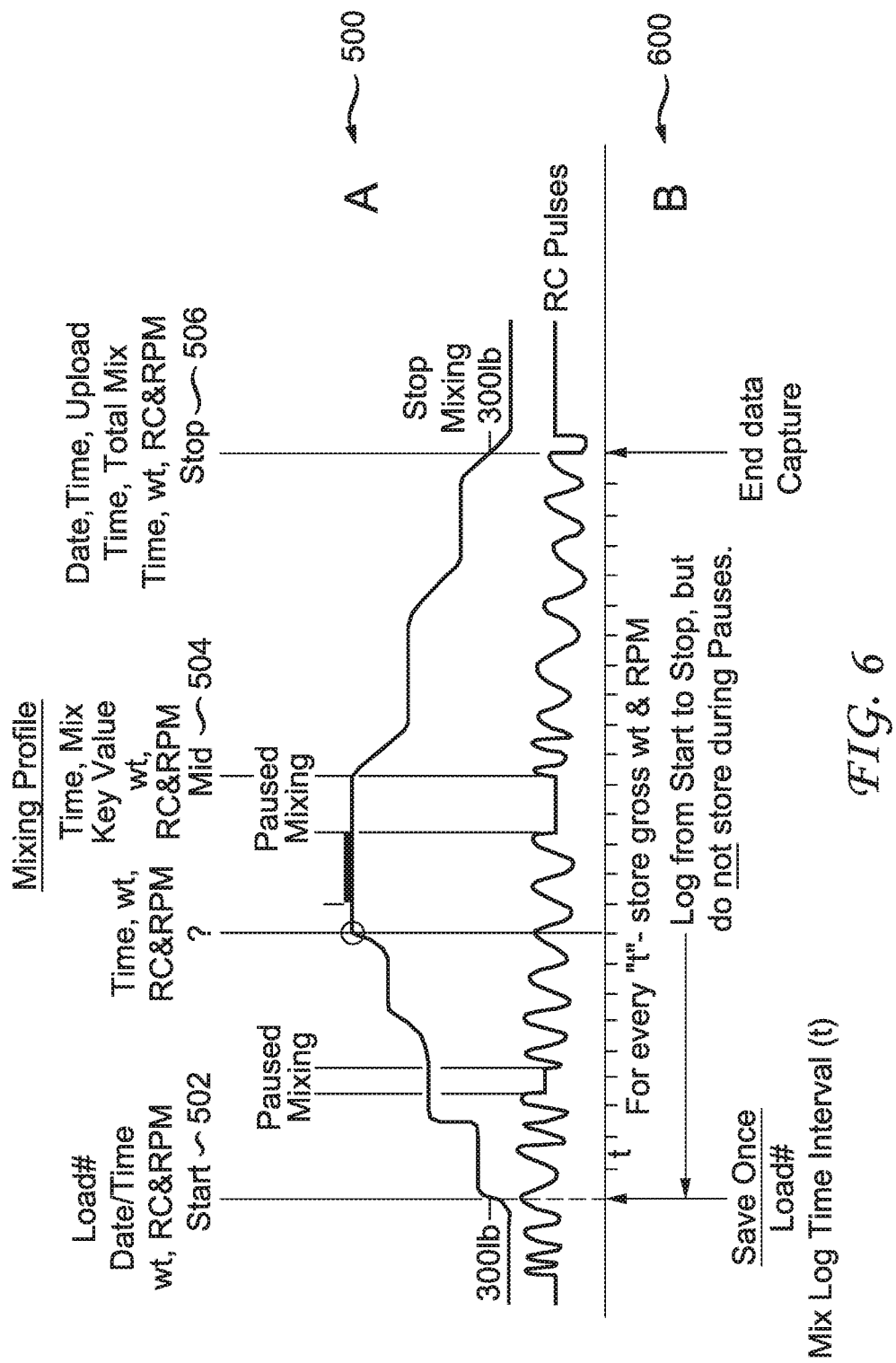
FIG. 6 depicts mixing profile and a mixing log according to one embodiment.

FIG. 6 depicts mixing profile 500 from FIG. 5 and also includes mixing log 600. In one embodiment, data is captured every X number of seconds (e.g., 1-999, with a default of 15). This interval can be identified by a user via a menu setting. The timer interval is selected to provide enough detail to create a chart showing how a feed mixer was used. In one embodiment, such data is captured for each mixer load. The data can be collected for the entire feeding cycle including loading the mixer with ingredients, mixing the ingredients (mix time), and unloading the mixer. Data is stored when a user pauses the mixing cycle (i.e., no rotation pulses). In one embodiment, data is recorded for at least the last 50 loads.

Rotation pulse data (i.e., RPM) is saved beginning at starting point 502. The data logged for each mixer load at start point 502 includes:
    i. Once per load: Mix Load Number (123—Automatically increases for each load and should rollover from 999 to 001.)
    ii. Once per load: Mix Log Time Interval Seconds (123)
    iii. Current Gross Weight (should be near 0 lbs/kgs).
    iv. Current RPM value (1234—four numbers).

```
Example data:
                10       20        30       40        50
       123456789012345678901234567890123456789012345678901 2
Start -> "001,015,000010,0015,000120,0015,000240,0015... . ."
        i  ii  iii     iv iii      iv       iii      iv... . .
```

Data capture and storage for the mix log ends at stop point 506.

Figure 7:
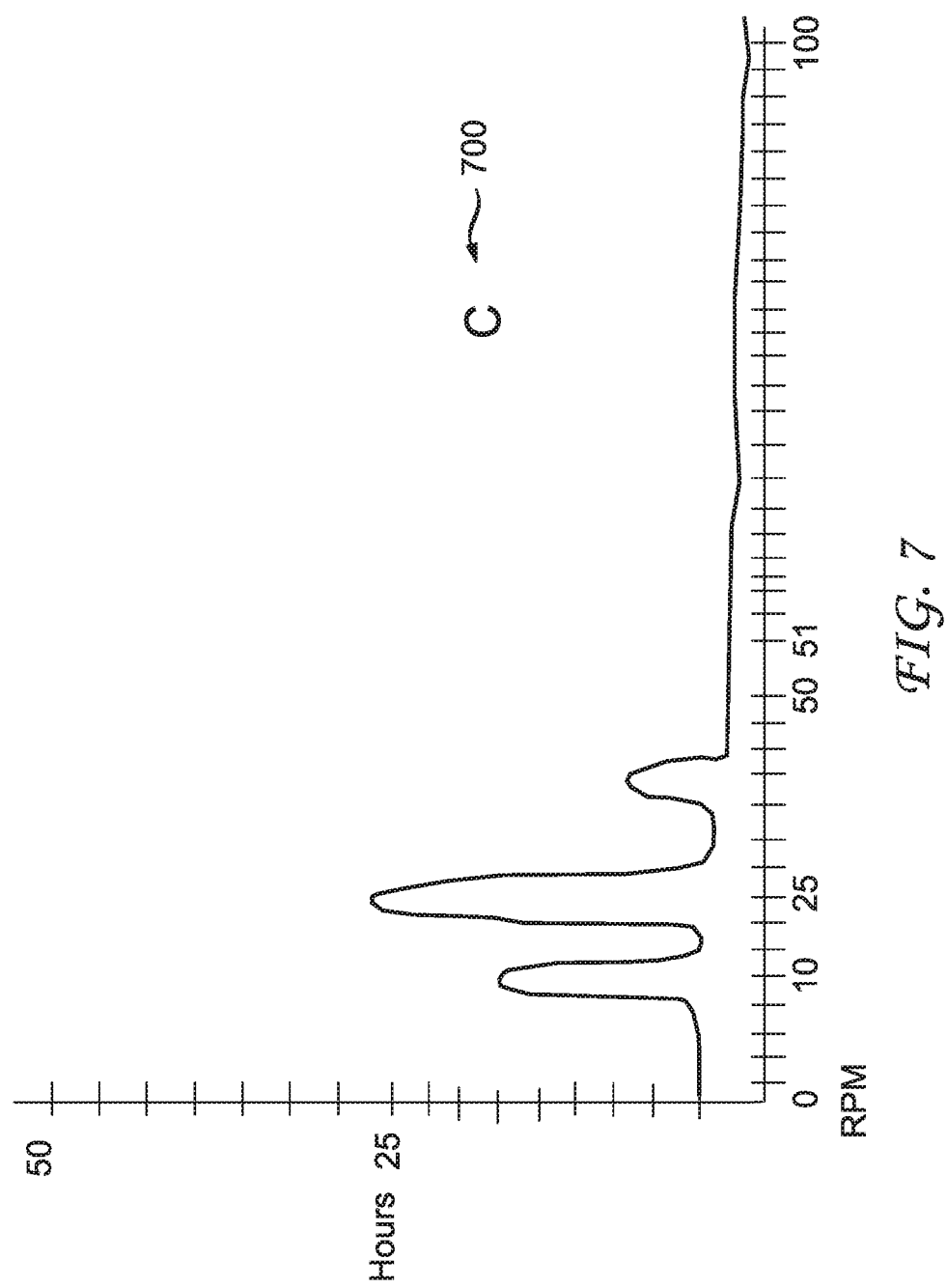
FIG. 7 depicts a graph illustrating hours a machine is run at various RPMs.

FIG. 7 depicts Hours/RPM graph 700 which shows hours a machine has been run at various RPMs. Mixers and other equipment typically have optimal speeds. Recording speed information allows an OEM to know how an end user is using a piece of equipment, such as a mixer. In addition, recorded speed information allows an OEM to determine if changes are required to better use the equipment (i.e., mix ingredients better). Because applications may vary, a flexible way to capture RPM is provided. Some examples of possible menu settings include:
    v. Capture every hour for RPM's from 0-99 RPM's.
        1. RPM History Low Starting Point=0.
        2. RPM History Low Resolution=1.
        3. RPM History High Starting Point=50.
        4. RPM History High Resolution=1.
    vi. Capture every hour for RPM's from 0-49 RPM's and also look at RPM's above 50, but at a lower resolution.
        5. RPM History Low Starting Point=0.
        6. RPM History Low Resolution=1.
        7. RPM History High Starting Point=50.
        8. RPM History High Resolution=5.
    vii. Capture every hour for RPM's from 250-350 RPM's and 950-1050 RPM's.
        9. RPM History Low Starting Point=250.
        10. RPM History Low Resolution=2.
        11. RPM History High Starting Point=950.
        12. RPM History High Resolution=2.

In one embodiment, another method for capturing RPM includes:
    viii. Add the capability to the indicator to record the amount of time that the feed mixer is running and at what RPM at two different RPM's.
        13. Allow a maximum of 50 data points (each). The data point value should support numbers up to 999,999,999 (ulong is fine) to provide enough history.
        14. Add Menu Settings to the indicator to tailor how these data points are used:
            a. RPM History Low Starting Point (default=0).
            b. RPM History Low Resolution (default=1).
            c. RPM History High Starting Point (default=50).
            d. RPM History High Resolution (default=1).
    ix. Allow these Menu Settings to be set remotely (by the App or serially).
    x. Allow the data points to be reset remotely to 0 (by the App or serially). This dears ALL data points, not on an individual basis.
        15. Nice to Have—separate resets for Low and High history.
    xi. Nice to Have—Use the "Low Starting point" to record ALL of the hours for any RPM's at or below that RPM.
    xii. Nice to Have—Use the last RPM data point of the "High Starting point" to record ALL of the hours for any RPM's at or above that RPM.

All of the data described above can be captured by a machine control head and various sensors. The data can be transferred to a customer service center for remote viewing and analysis.

Returning to FIG. 1, communication between machine control indicator 106, user device 120 and customer service device 124 also facilitates display of current machine RPM. This allows a user and a customer service representative to see how the user is currently operating a machine, such as a feed mixer.

Communication also facilitates viewing of peak weight transfers in order to determine possible equipment abuse issues. In one embodiment, peak weight transfer information is only available to a customer service representative and not a user.

Communication also facilitates transmission of data pertaining to user input to a machine control indicator. In one embodiment, key presses reflecting a user interacting with a machine control indicator are recorded and can be transmitted to a customer service representative for viewing and analysis. This information can help a customer service representative understand how a user is interacting with the machine control indicator.

Communication also facilitates transmission of current alarm status information on a cab control app. In one embodiment, the current alarm status allows a user to know when to shut off a machine, such as an auger, when away from the scale while loading ingredients from bins, tanks, and/or silos.

Communication facilitates bi-directional transfer of total mixed rations (TMR) tracker feedline batching feedlines. Total mixed rations, in one embodiment, are recipes used to produce proper feed mixes. In one embodiment, TMR information is tracked by a machine control indicator and can be retrieved and displayed by a user device and/or a customer service device. A customer service representative can use TMR information received from a machine control indicator to determine how a TMR recipe should be adjusted based on information from a user after examination and analysis of feed output from a mixer. A customer service representative can also transmit a new and/or modified recipe to a machine control indicator in order to correct an issue with a feed mix. The new and/or modified recipe could be created using a feed management computer program (such as TMR Tracker).

In one embodiment, machine control indicator 106 of FIG. 1 has additional sensor inputs (e.g., analog and/or digital inputs). In one embodiment, additional sensors can be used to provide data to machine control indicator 106 in order to record parameters, such as temperature, and produce alarm outputs to alert a user to certain conditions. For example, temperature sensors can be placed in machine gearboxes in order to track the temperature of gear fluid in the gearbox and provide warnings to a user as necessary. In one embodiment, warning messages and/or alarms are provided to a user when a temperature exceeds a value for a temperature parameter set via a menu setting.

In one embodiment, the machine control indicator has a menu setting which allows a user to customize an alphanumeric message, such as a warning message, to be displayed when a certain condition occurs, such as a maximum temperature being exceeded. For example, a maximum temperature being exceeded can produce a warning message, such as "HITEMP", on a display of the machine control indicator. In one embodiment, a warning message interrupts a displayed weight and the message flashes for 3 seconds. Next, a scaled sensor value is flashed for 3 seconds before the indicator returns to displaying a weight. The displaying of warning messages and scaled sensor values can be repeated, in one embodiment, every minute, until the input goes below the maximum setting.

In one embodiment, a menu selection of the machine control indicator allows a user to indicate that an alarm light is to be activated when a maximum setting has been reached. For example, a user can set an alarm light to illuminate when a maximum temperature has been met and/or exceeded.

In one embodiment, a menu selection of the machine control indicator allows a user to indicate when an alarm (such as an audible alarm) is to be output. For example, a user can set an alarm to be output when a maximum temperature has been met and/or exceeded.

In one embodiment, the machine control indicator includes a menu setting which allows a user to calibrate and/or scale sensor inputs. In one embodiment, a selection offered by the machine control indicator allows a sensor value to be displayed on a large display such as a six character LCD.

Machine control indicator 106, in one embodiment, can store sensor values. For example, the last 5 peak scaled sensor reading can be stored. In one embodiment, values to be stored per sensor input include: a scaled sensor value (i.e., gear box 1 temperature—1234), time (14:10:05), Date (05FE08), and elapsed time over the "maximum setting" value (HHH:MM:SS). This data can be transferred to a customer service device and/or to a web-server for storage and later viewing. Scaled sensor reading, such as temperatures) can be included in both Section A—mixing details (shown in FIG. 5) and Section B-Mixing log (shown in FIG. 6).

```
Example of updated Section A data:
                  10        20        30        40        50
           123456789012345678901234567890123456789012345678901
Start -> "000000,2150,0018,0070,0000,14:10:05,05FE08,0001"
  Mid -> "024150,2175,0024,0120,0000,00:14:25,000025,024150"
  End -> "000000,2195,0010,0100,0000,00:08:10,00:22:35,14:33:35,05FE08"
```

With respect to Section B data, the data for the mixing log is saved beginning at the starting point described in Section A. The data to be logged for each mixer load at start point 502 includes:

iv. Once per load: Mix Load Number (123—Automatically increases for each load and should rollover from 999 to 001.)

v. Once per load: Mix Log Time Interval Seconds (123)

vi. Once per load: Maximum Sensor 1 Setting (1234)

vii. Once per load: Maximum Sensor 2 Setting (1234)

viii. Current Gross Weight (should be near 0 lbs/kgs).

ix. Current RPM value (1234—four numbers).

x. Current Scaled Sensor 1 value (1234—four numbers).

xi. Current Scaled Sensor 2 value (1234—four numbers).

Repeat v-viii until "stop point".

A data stream including the data above, according to one embodiment, is as follows:

```
Example data:
                  10        20        30        40        50
           123456789012345678901234567890123456789012345678901
Start -> "001,015,0150,0150,000010,0015,0070,000,...."
           i   ii   iii       iv   v       vi   vii viii, repeat ... . .
```

In one embodiment, data storage ends for the mix log at stop point 506 shown in FIGS. 5 and 6.

Figure 8:
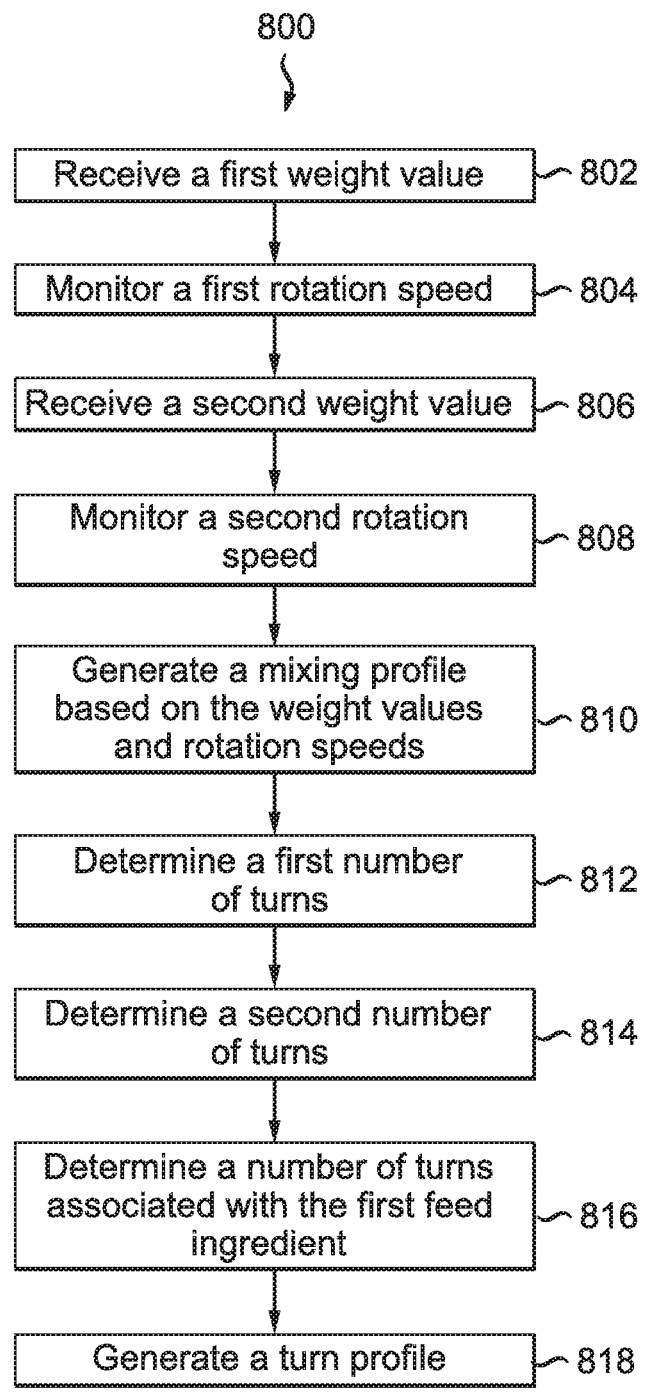
FIG. 8 depicts a flow chart of a method of operating a machine control indicator according to an embodiment.

FIG. 8 depicts a flow chart of a method 800 of operating a machine control indicator (e.g., scale indicator 106 of FIG. 1) according to one embodiment. At step 802, a first weight value is received from a sensor associated with a feed mixer. In one embodiment, the first weight value is sensed by weight sensor 118 and is indicative of a weight of a first feed ingredient. At step 804, a first rotation speed of the feed mixer is monitored and associated with the first weight value. In one embodiment, the first rotation speed is sensed by revolutions per minute sensor 108. At step 806, a second weight value is received from a sensor associated with the feed mixer. In one embodiment, this second weight value is sensed by weight sensor 118 and is associated with a second feed ingredient. At step 808, a second rotation speed of the feed mixer is monitored and associated with the second weight value. At step 810, a mixing profile is generated based on the first weight value, the second weight value, the first rotation speed, and the second rotation speed. In one embodiment, step 810 occurs in response to detecting that rotation of the feed mixer has stopped or initiated via user input to the scale indicator.

As stated previously, a user may want to know the number of turns each ingredient was mixed. At step 812, a first number of turns of the feed mixer at the first weight value is determined based on the first rotation speed of the mixer and a time period during which the first rotation speed occurred. At step 814, a second number of turns of the feed mixer at the second weight value is determined based on the second rotation speed of the feed mixer and a time period during which the second rotation speed occurred. At step 816, a number of turns associated with the first feed ingredient is determined based on the first number of turns and the second number of turns. This is because the first feed ingredient was mixed during both the time period associated with the first rotation speed and the time period associated with the second rotation speed. The second feed ingredient is mixed only during the time period associated with the second rotation speed. At step 818, a turn profile is generated indicating the number of turns associated with the first feed ingredient and the second number of turns, wherein the second number of turns is associated with the second feed ingredient. The turn profile can be displayed to a user via the scale indicator in order to determine how the feed was mixed.

In one embodiment, the first rotation speed and the second rotation speed are associated with one of an auger, a rotor, or a reel of the feed mixer. The feed mixer, in one embodiment, is operated by the machine control indicator at the first rotation speed for a first time period and at the second rotation speed for a second time period in accordance with a stored mixing profile. In one embodiment, instructions from a user are received at the machine control indicator to change one of the first time period and the second time period based on the stored mixing profile and a condition of feed in the feed mixer after mixing. These adjustments to the stored mixing profile can be made by a user after examining mixed feed and determining that certain feed ingredients require more or less turns.

It should be noted that the number of weight values received and the number of rotation speeds monitored can vary based on the number of feed ingredients to be mixed. For example, if four feed ingredients are to be mixed, there could be an associated number of weight values and number of rotation speeds monitored to reflect the four feed ingredients. It should also be noted that the various rotation speeds can be the same or different.

In one embodiment, the machine control indicator can be configured to detect over speed conditions and alert a user by a warning. A speed of the mixer above a threshold is detected by the machine control indicator from values received from revolutions per minute sensor 108. The machine control indicator generates a warning based on the detected over speed and displays a warning via a display of the machine control indicator. In one embodiment, the warning is stored in a memory of the machine control indicator with a date and time the warning was generated. The stored warning can aid a user in diagnosing problems with the feed mixer as well as improper operation of the feed mixer by an operator.

Figure 9:
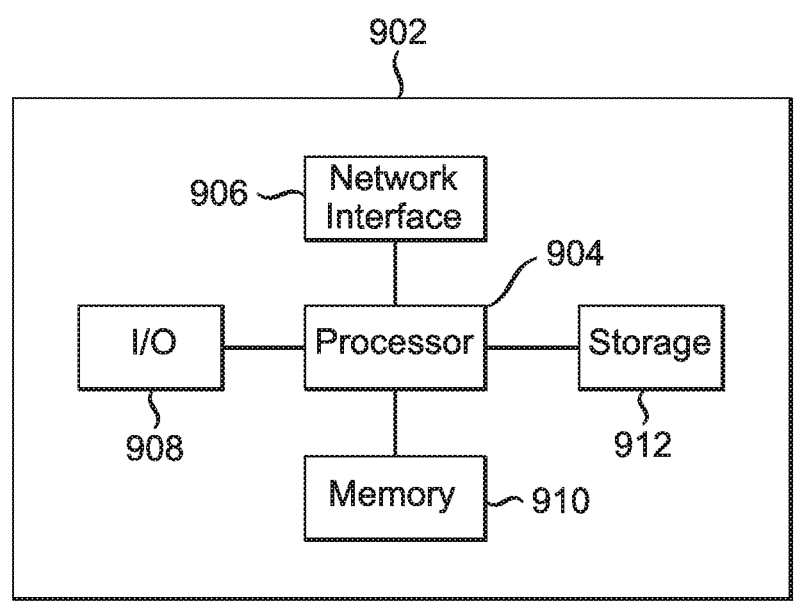
FIG. 9 depicts a high level block diagram of a computer.

Machine control indicator 106 of FIG. 1, machine control indicators shown in other figures, and other components can be implemented using a computer. A high-level block diagram of such a computer is illustrated in FIG. 9. Computer 902 contains a processor 904 which controls the overall operation of the computer 902 by executing computer program instructions which define such operation. The computer program instructions may be stored in a storage device 912, or other computer readable medium (e.g., magnetic disk, CD ROM, etc.), and loaded into memory 910 when execution of the computer program instructions is desired. Thus, the method steps of FIG. 8 can be defined by the computer program instructions stored in the memory 910 and/or storage 912 and controlled by the processor 904 executing the computer program instructions. For example, the computer program instructions can be implemented as computer executable code programmed by one skilled in the art to perform an algorithm defined by the method steps of FIG. 8. Accordingly, by executing the computer program instructions, the processor 904 executes an algorithm defined by the method steps of FIG. 8. The computer 902 also includes one or more network interfaces 906 for communicating with other devices via a network. The computer 902 also includes input/output devices 908 that enable user interaction with the computer 902 (e.g., display, keyboard, mouse, speakers, buttons, etc.) One skilled in the art will recognize that an implementation of an actual computer could contain other components as well, and that FIG. 9 is a high level representation of some of the components of such a computer for illustrative purposes.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A method comprising:
receiving, at a machine control indicator, a first weight value from a sensor associated with a feed mixer;
monitoring, at the machine control indicator, a first rotation speed of the feed mixer associated with the first weight value during a first time period;
receiving, at the machine control indicator, a second weight value from the sensor associated with the feed mixer;
monitoring, at the machine control indicator, a second rotation speed of the feed mixer associated with the second weight value during a second time period;
generating, at the machine control indicator, a mixing profile based on the first weight value, the second weight value, the first rotation speed, the second rotation speed, the first time period, and the second time period;
storing the mixing profile;
transmitting, from the machine control indicator, the stored mixing profile to a remote device;
receiving, at the machine control indicator, instructions to change one of the first time period and the second time period based on an examination of mixed feed ingredients in the feed mixer and determining that one or more of the feed ingredients require more or less turns of the feed mixer after the second time period; and
adjusting the stored mixing profile based on the determining.

2. The method of claim 1, wherein a first feed ingredient of the feed ingredients is associated with the first weight value and a second feed ingredient of the feed ingredients is associated with the second weight value, a weight of the second feed ingredient being approximately equal to the second weight value minus the first weight value.

3. The method of claim 2, further comprising:
determining a first number of turns of the feed mixer at the first weight value based on the first rotation speed of the feed mixer and the first time period during which the first rotation speed occurred;
determining a second number of turns of the feed mixer at the second weight value based on the second rotation speed of the feed mixer and the second time period during which the second rotation speed occurred;
determining a number of turns associated with the first feed ingredient based on the first number of turns and the second number of turns; and
generating a turn profile indicating the number of turns associated with the first feed ingredient and the second number of turns, wherein the second number of turns is associated with the second feed ingredient.

4. The method of claim 1, wherein the first rotation speed and the second rotation speed are associated with one of an auger, a rotor, or a reel of the feed mixer.

5. The method of claim 1, further comprising:
detecting a rotation speed of the feed mixer above a threshold;
generating a warning based on the detecting; and
displaying the warning via the machine control indicator and storing the warning in a memory with a date and time the warning was generated.

6. The method of claim 1, further comprising:
monitoring a third rotation speed of the feed mixer associated with discharging the feed mixer,
wherein the generating the mixing profile is further based on the third rotation speed.

* * * * *